US009916008B2

(12) United States Patent
Bostick et al.

(10) Patent No.: US 9,916,008 B2
(45) Date of Patent: Mar. 13, 2018

(54) MICROFLUIDICS THREE-DIMENSIONAL TOUCH SCREEN DISPLAY

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 14/594,497

(22) Filed: Jan. 12, 2015

(65) Prior Publication Data
US 2016/0202761 A1    Jul. 14, 2016

(51) Int. Cl.
*G06F 3/01* (2006.01)
*G06F 3/041* (2006.01)
(Continued)

(52) U.S. Cl.
CPC .............. *G06F 3/016* (2013.01); *G06F 3/044* (2013.01); *G06F 3/0414* (2013.01);
(Continued)

(58) Field of Classification Search
CPC ...... G06F 3/016; G06F 3/0414; G06F 3/0416; G06F 3/044
See application file for complete search history.

(56) References Cited

U.S. PATENT DOCUMENTS 6,037,955 A    3/2000    DeBoer et al.
7,403,191 B2   7/2008    Sinclair
(Continued)

FOREIGN PATENT DOCUMENTS

WO    2012/076062    6/2012
WO    2013/061168    5/2013
WO    2013/100978    7/2013

OTHER PUBLICATIONS

Bostick, James E., et al, "Generating a Three-Dimensional Representation of a Topography", U.S. Appl. No. 14/537,287, filed Nov. 10, 2014.
(Continued)

*Primary Examiner* — Kent Chang
*Assistant Examiner* — Scott Au
(74) *Attorney, Agent, or Firm* — Whitham, Curtis & Cook, PC; John R Pivnichny (57) ABSTRACT

A microfluidic transducer is overlaid on a two-dimensional display and controlled in accordance with metadata corresponding to a displayed image to cause raising of a surface of the microfluidic transducer to represent objects depicted in the image and at least the relative distance of such objects from a viewing point of the image to form a touch screen allowing the image to be navigated and manipulated in the form of a tactile display, particularly for persons having visual impairment. The distance information is preferably captured during initial capture of the image and stored as metadata but can also be determined by image analysis. Object analysis is also provided for objects in the image for identification that can be conveyed by touch or audibly and the relative hardness of softness, texture and color of objects is conveyed by compliance, motion and/or temperature of the surface of the microfluidics transducer.

19 Claims, 5 Drawing Sheets

(51) Int. Cl.
*G06F 3/044* (2006.01)
*G09B 21/00* (2006.01)
*G06F 3/0488* (2013.01)

(52) U.S. Cl.
CPC .......... *G06F 3/0416* (2013.01); *G06F 3/0488* (2013.01); *G09B 21/004* (2013.01); *G09B 21/006* (2013.01); *G09B 21/007* (2013.01)

(56) References Cited

U.S. PATENT DOCUMENTS

| | | | |
|---|---|---|---|
| 7,477,331 | B2 | 1/2009 | Lin et al. |
| 7,864,161 | B2 | 1/2011 | Hollemans et al. |
| 8,203,537 | B2 | 6/2012 | Tanabe et al. |
| 8,232,976 | B2 | 7/2012 | Yun et al. |
| 8,368,566 | B2 | 2/2013 | Higa |
| 8,385,588 | B2 | 2/2013 | Jacoby et al. |
| 8,593,420 | B1 | 11/2013 | Buuck |
| 8,619,035 | B2 | 12/2013 | Ciesla et al. |
| 2011/0157080 | A1 | 6/2011 | Ciesla et al. |
| 2011/0216013 | A1 | 9/2011 | Siotis |
| 2011/0304550 | A1 | 12/2011 | Jolliff et al. |
| 2012/0236173 | A1* | 9/2012 | Telek .................. G03B 17/08 348/223.1 |
| 2012/0280920 | A1 | 11/2012 | Jackson et al. |
| 2013/0155020 | A1 | 6/2013 | Heubel et al. |
| 2013/0181946 | A1 | 7/2013 | Lee |
| 2013/0317130 | A1 | 11/2013 | Brassard et al. |
| 2014/0160064 | A1 | 6/2014 | Yairi et al. |
| 2014/0192247 | A1* | 7/2014 | Cheong .................. G06F 3/011 348/333.11 |
| 2016/0140249 | A1* | 5/2016 | Flawn .................. G06F 17/217 715/205 |

OTHER PUBLICATIONS

Ragan, Rick, et al, Physical Presence of a Virtual Button on a Touch Screen of an Electronic Device, U.S. Appl. No. 14/180,587, filed Feb. 14, 2014.

Ragan, Rick, et al, Apparatus for Providing a Three Dimensional Tactile Display of an Electronic Device, U.S. Appl. No. 14/316,834, filed Jun. 27, 2014.

"Image Texture", Wikipedia, printed Sep. 8, 2014, 4 pages.
"Depth Map", Wikipedia, printed Sep. 8, 2014, 4 pages.
Johnson, Casey, "Microfluidics Panel Could Add Physical Buttons to a Touch Screen", Gear & Gadgets/Product News & Reviews, Jan. 23, 2014, 3 pages.
"A Touchscreen with Keys that Rise and Disappear—What's Next—CNN.com Blogs", url: http://whatsnext.blogs.cnn.com/2012/06/06/a-touchscreen-with-keys-that-rise-and-disappear/, printed Sep. 8, 2014, 17 pages.
Google Play, Partometer—Camera Measure, Android Apps on Google Play, printed Sep. 8, 2014, 3 pages.
Google Play, Partometer3D—Photo Measure, Android Apps on Google Play, printed Sep. 8, 2014, 3 pages.
NIST 'Pins' Down Imaging System for the Blind, National Institute of Standards and Technology, date created Sep. 13, 2002, updated Oct. 5, 2010, printed Sep. 8, 2014, 1 page.
Caofeng Pan, et al, High-Resolution Electroluminescent Imaging of Pressure Distribution Using a Piezoelectric Nanowire LED Array, Nature Photonics, Nature.com, Published on-line Aug. 11, 2013, Abstract Only.
Cow Forum, "Turning a 2D Picture into a 3D Object in AE CS6", Creativecow.net, url: http://forums.creativecow.net/thread/202/898438, printed Sep. 8, 2014, 2 pages.
Evans, Duncan, "How to Turn a 2D Object into a 3D Object Using Photoshop", Macworld, May 13, 2013, 7 pages.
The Technology, Micro/Fluidics 2.0, printed Sep. 8, 2014, 1 page.
Jillian D'Onfro; "This Insane Technology that Makes Buttons Appear on a Flat Smartphone Screen is Pretty Close to Magic"; Business Insider, Jan. 9, 2014; 2 pgs.
IBM; "Touch: You will be able to touch through your phone"; The IBM 5 in 5, 3 pgs.
Adam Goswick; "Touch Meets Texture . . . Electronically with TeslaTouch!"; DizTech, vol. 9, Jan. 7, 2014, 2 pgs.
Sean Cooper; "Tactus morphing touchscreen keyboard hands-on (with video)"; Jan. 8, 2013, 4 pgs.
National Institute of Standards and Technology Public Affairs Office; "NIST 'Pins' Down Imaging System for the Blind"; Sep. 13, 2002.
Caofeng Pan et al.; "High-resolution electroluminescent imaging ofpressure distribution using a piezoelectric nanowire LED array"; Nature Photonics, No. 7, Aug. 11, 2013.
Wikipedia; "Haptic Technology"; http://en.wikipedia.org/wiki/Haptic_technology.

* cited by examiner

MICROFLUIDICS THREE-DIMENSIONAL TOUCH SCREEN DISPLAY

FIELD OF THE INVENTION

The present invention generally relates to image analysis and display of images to provide a third dimension as displayed and, more particularly, to the display of images containing three or more dimensions of information on a touch screen device such that the images can be more readily understood and navigated, especially by persons having a visual impairment.

BACKGROUND OF THE INVENTION

Visual displays are virtually indispensable for rapid communication between a device capable of some level of data storage and access and/or processing and a user of such a device. For example, even prior to the introduction of personal computers, an alphanumeric display on a cathode ray tube or the like was used as an output of the data processor while keyboards and cursor controls were used as input devices. More recently, as the capabilities of display devices (e.g. color, resolution and various graphic attributes) have increased, display of graphic images has been found to be highly efficient to rapidly convey large amounts of information to a user.

It has also been found that a user can often directly interact with an image more efficiently than can be done through other types of input devices such as keyboards, particularly for manipulation of the image itself (e.g. zoom/size, panning, scrolling, rotation, etc.). At the present state of the art and with the development of highly miniaturized devices such as personal digital assistants (PDAs), so-called notebook, palm-top and tablet computers and, especially, wireless communication devices with substantial data processing capabilities such as so-called smart phones, display devices that are also able to sense touch, pressure or even proximity of a finger or other extremity of a user have supplanted many other types of input devices (e.g. light pens and various types of cursor controllers) for directly interacting with and selecting and manipulating images. For example, it is not uncommon for a user of a smart phone or tablet computer to use such a device to access and select from a large number of images such as a public or personal library or album of photographs and even use the cameras currently available in most smart phones to capture and store images into such a library or album or for a keyboard to be emulated with an image and touch sensors.

However, the display panels of such devices that may also be used as keyboards or to emulate other input structures are generally flat and most lack any provision for tactile feedback to which a user may have become accustomed and/or to allow a user to locate various available controls such as virtual buttons or knobs by touch rather than by sight. The process of locating a control that may exist only as displayed indicia distracts from concentration on a displayed image of interest and does not indicate that the display device has, in fact, recognized a user action as an input other than by a change in the display. These difficulties of use of touch panels are particularly acute for users having visual impairments. Therefore, various devices to provide a tactile or audible indication that a control command (e.g. actuation of a virtual key) has been recognized have been proposed and implemented with limited success.

More recently, it has been proposed to provide an overlay in the form of a controllable, possibly by microfluidics (which refers to both the study of the flow of fluids in space having a transverse dimension of micrometer size and devices that exploit such phenomena) transparent membrane over an otherwise featureless display screen to simulate knobs or keys that can be located and identified by touch. While such arrangements can provide tactile feedback and provide for allowing convenience using the touch screen interface, persons having visual impairments may still have substantial difficulty in comprehending, understanding and, especially, navigating images, in general, while some particular images and image features may present more difficulty than others for partially sighted persons. Further, while display of alphanumeric characters in braille on specially constructed "display" devices are known, no arrangements for allowing interaction with a graphic image by blind or severely visually impaired persons have been available. Even for persons with no significant visual impairment, an image of an object does not contain as much information about an object as the visible surface of the object itself and obscures depth information and other information that cannot readily be conveyed visually.

SUMMARY OF THE INVENTION

It is therefore an object of the present invention to provide a method and apparatus for providing increased amounts of information in a three-dimensional display of an image.

It is another object of the invention to facilitate direct interaction with an image and selection, navigation and manipulation of one or more images by users having visual impairments or who are blind or only partially sighted and support enhanced provision of increased amounts of information beyond that contained in the image, itself, to persons without vision impairment through increased dimensionality and tactile sensation.

It is a further object of the invention to provide enhanced tactile communication and/or feedback to a user including textures and compliance (e.g. hardness, softness, elasticity and the like) of surfaces depicted in displayed images.

In order to accomplish these and other objects of the invention, a touch screen is provided comprising an image file containing metadata and data representing a visually perceptible image, an image analyzer for analyzing image data and metadata representing said visually perceptible image, said image analyzer including logic for recognizing and classifying objects represented and arranged in said image by identified type and mapping tactile attributes to recognized objects and storing results of the recognizing and classifying of objects as metadata, and a microfluidics transducer for producing selectively raised areas of a surface to represent said tactile attributes of said recognized objects and the arrangement of said objects in said image.

In accordance with another aspect of the invention, a method of conveying graphic information is provided comprising steps of determining relative distance information for objects in an image, the distance information corresponding to distances of said object from a point of view, storing the distance information as metadata corresponding to the image in an electronic file of the image, mapping the distance information to locations on a microfluidic transducer, controlling the microfluidic transducer to raise at least one respective area of a surface of the microfluidic transducer to a height in a range of heights corresponding to the distance information mapped to the corresponding respective area to form raised areas corresponding to the image.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
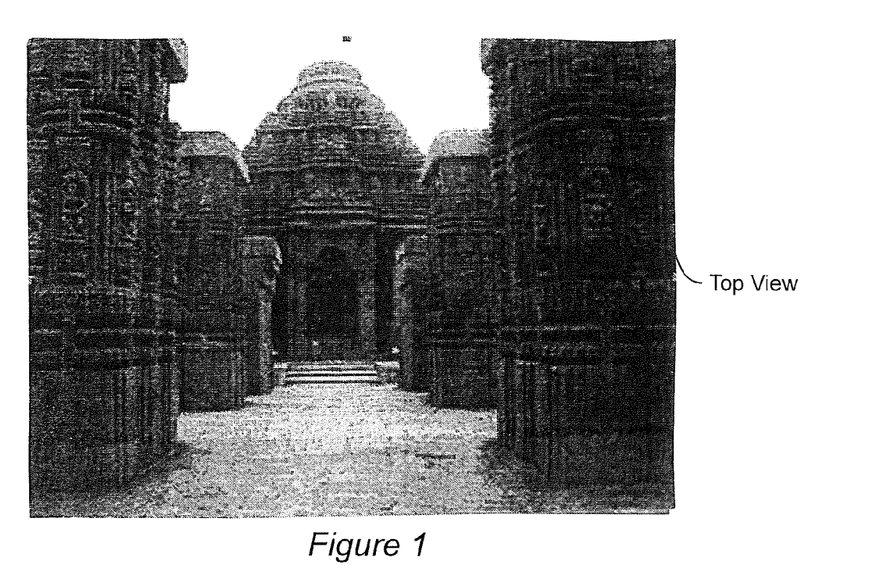
FIG. 1 is an exemplary image that a visually impaired person would experience difficulty in comprehending and/or understanding the content of the image.

Referring now to the drawings, and more particularly to FIG. 1, there is shown an exemplary image that would present significant difficulties of recognition, comprehension and navigation to a visually impaired person. While a person without visual impairment would immediately recognize the image as being aa view of a domed building through a colonnade, there are several characteristics of the two-dimensional image such as substantial symmetry of composition, lack of specular reflections or sharp shadows, diffuse lighting, low contrast, relatively uniform textures containing a high level of detail and features, repeated shapes at different sizes and the appearance of reduced detail near the center of the image where the highest level of detail would be expected; any or all of which would pose difficulty of recognition and comprehension to a visually impaired person. A visually impaired person would also be likely to experience confusion as to how such an image could be navigated (e.g. by zooming panning, scrolling, rotation or the like) to alter the view of the image in order to obtain more information about the subject matter depicted.

Figure 1A:
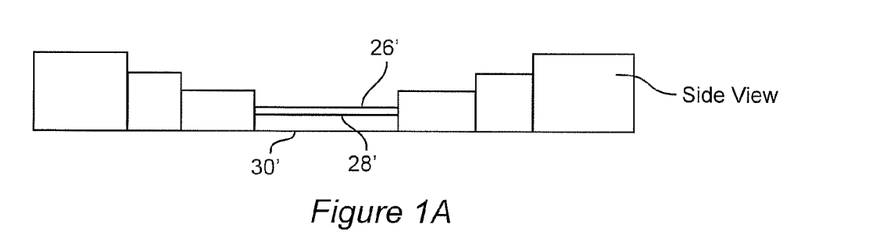
FIG. 1A is an approximation of a side view of the image of FIG. 1.

It should be appreciated that many techniques of image enhancement for display are known that can enhance the appearance of an image in regard to some of the features of the exemplary image of FIG. 1 or other images, particularly images that are generated by computer modeling. For example, reduced contrast or color intensity can enhance the appearance of increased distance of an object from the point of view in much the same manner as reduction in contrast and/or suppression of color or the like is used in some computer interfaces to indicate inactive or unavailable menu options. Conversely, there are many known techniques that can analyze an existing image to obtain additional information from an image that may not directly contain the desired information. For example, binocular depth perception is not available from a single two-dimensional image but, for purposes of estimating distance or depth, such techniques may include analyzing perspective to determine the included angle of view or comparison of detail size or contrast to determine relative distance from the point of view of the image (e.g. location of a camera relative to the objects depicted in the image). In other words, features of an image can usually be analyzed quantitatively to derive an approximation of the relative distances to objects such as is shown in the "side view" of FIG. 1 as depicted in FIG. 1A. Such information can be derived from the image as it is displayed or captured as the image is captured and stored as metadata in an electronic file of the image. The information can then be conveyed to a person viewing the image in various ways known in the art which may or may not actually resemble a third dimension for a two-dimensional image. For example, distance information could be conveyed as an audio tone having increased pitch or volume for increased proximity and vice-versa as objects depicted in the image are selected using, for example, a cursor. In such a case, the distance information is conveyed through a perceptible signal or sensation having little, if any, correspondence with the manner in which distance to real objects would be perceived by a sighted person viewing the actual scene.

Figure 1B:
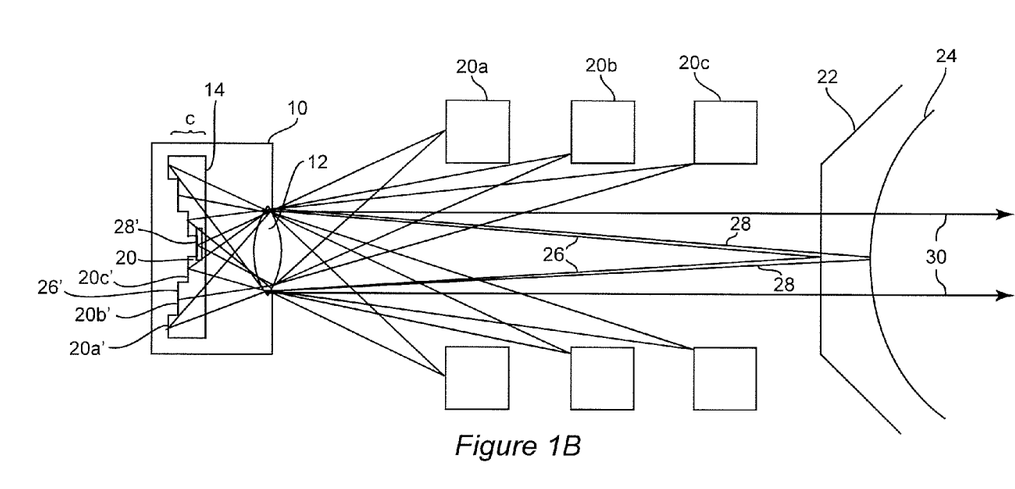
FIG. 1B illustrates a preferred technique by which distance/depth data can be captured incident to capturing an image using a camera.

However, for practice of the invention, the inventors prefer to convey distance or depth information in a more direct and intuitive manner and have recognized and prefer to capture depth/distance information at the time the image is captured as can be easily accomplished by use of automatic focusing capabilities similar to those now virtually ubiquitous in digital cameras. Alternatively, depth/distance information can be approximated by image analysis and similarly stored as metadata for the image so that image analysis is performed only once rather than performed whenever the image is displayed or on demand. Devices to make measurements of distances and object dimensions are currently available commercially. Also, in currently available digital cameras, a window is generally specified within the field of view of the camera view finder that will be used for purpose of automatically focusing the camera. In other words, the surface of an object appearing within that window (whether or not the boundaries of the window are visible in the viewfinder) will be used to adjust the lens location relative to the focal plane of the camera to bring that surface visible within the window into good focus at the focal plane. (The respective distances to the plane of the surface and the focal plane from the center of the lens are referred to as conjugate distances or conjugate planes.) It is a simple matter of programming of the camera processor to move the window used for focusing over various portions or all of the image as seen through the viewfinder (or shift the camera axis manually to bring various objects into the focus window and select them) as illustrated in FIG. 1B to collect relative distance data for surfaces visible in the image to be captured. Such relative distance data can then be stored as metadata for the image as alluded to above and, if displayed, would resemble the side view approximation of the image as depicted in FIG. 1A.

Specifically, FIG. 1B depicts an approximation of a plan view of the objects visible in the image of FIG. 1 together with a schematic representation of a camera 10 and a lens 12. For clarity, the camera 10 is depicted as having a lens in a fixed location and a focal plane 14 that is movable through a dimension C to bring objects such as columns 20, building 22 and dome 24 located at different distances from camera 10 into good focus at locations 20a'-20c', 26' and 28'. Rays 30 are depicted as being parallel to the right of lens 12 and being converged at focal plane 14, corresponding to being focused at infinity, since these rays are not reflected from any object in the image and thus represent background. Rays such as 26 and 28 representing light reflecting from respective surfaces are shown as being converged by lens 12 at respective conjugate distances C shown at 20a'-20c', 26', 28' and 30' (the focal plane 14) at or behind the focal plane of the camera 10 as is well-understood in the art. It will be noted that the profile of these distances corresponds to the "side view" of FIG. 1A.

Figure 1C:
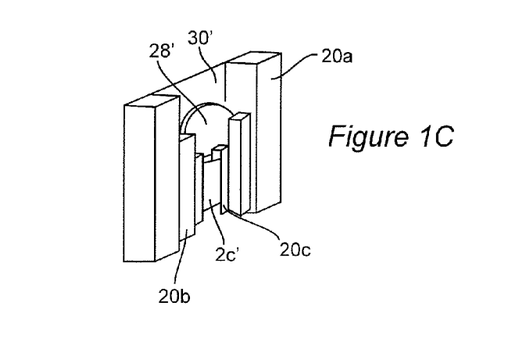
FIG. 1C is an oblique view of a representation of distance information corresponding to the image of FIG. 1 which is useful in visualizing the metadata captured in the manner illustrated in FIG. 1B.

To assist in visualizing these conjugate distances which correspond to distance to objects in the image, an oblique view of this distance information that is automatically (or manually) mapped across the area of the image is shown in FIG. 1C. It should be appreciated from FIG. 1C that the various objects (e.g. columns, building, dome and background) are inherently identified as discrete objects with visible edges defined in location and are categorized by distance into respective planes which also defines overlap or occultation of the respective objects. This information may also be stored as metadata or reconstructed from the distance information and used for advanced image navigation and display generation purposes as will be discussed in greater detail below. For example, such information allows objects in a given plane to be selected and displayed and/or manipulated to the exclusion of other objects in other planes of the image and, further, a given object in a selected plane can be selected and independently manipulated (e.g. moved within the plane or moved between planes). Additionally, planes can be rearranged to simulate distances different from those in the original image. Many such image manipulation effects and controls are known in the digital image generation and display arts and innumerable others are foreseeable.

It will also be appreciated that such distance information is essentially constant over respective areas of the image and can be collected in a manner corresponding to "zones" of an image (e.g. a matrix of rectangular areas or an array of wedge-shaped areas or the like) or the areas of respective objects appearing in an image. Once manually or automatically collected, this distance information can be stored as metadata corresponding to a digital file of the image and utilized in developing a third dimension of the image that can the perceived visually (e.g. by viewing at an angle) or, preferably, for visually impaired users, by touch in a manner that will be discussed in further detail below.

Figure 2A:
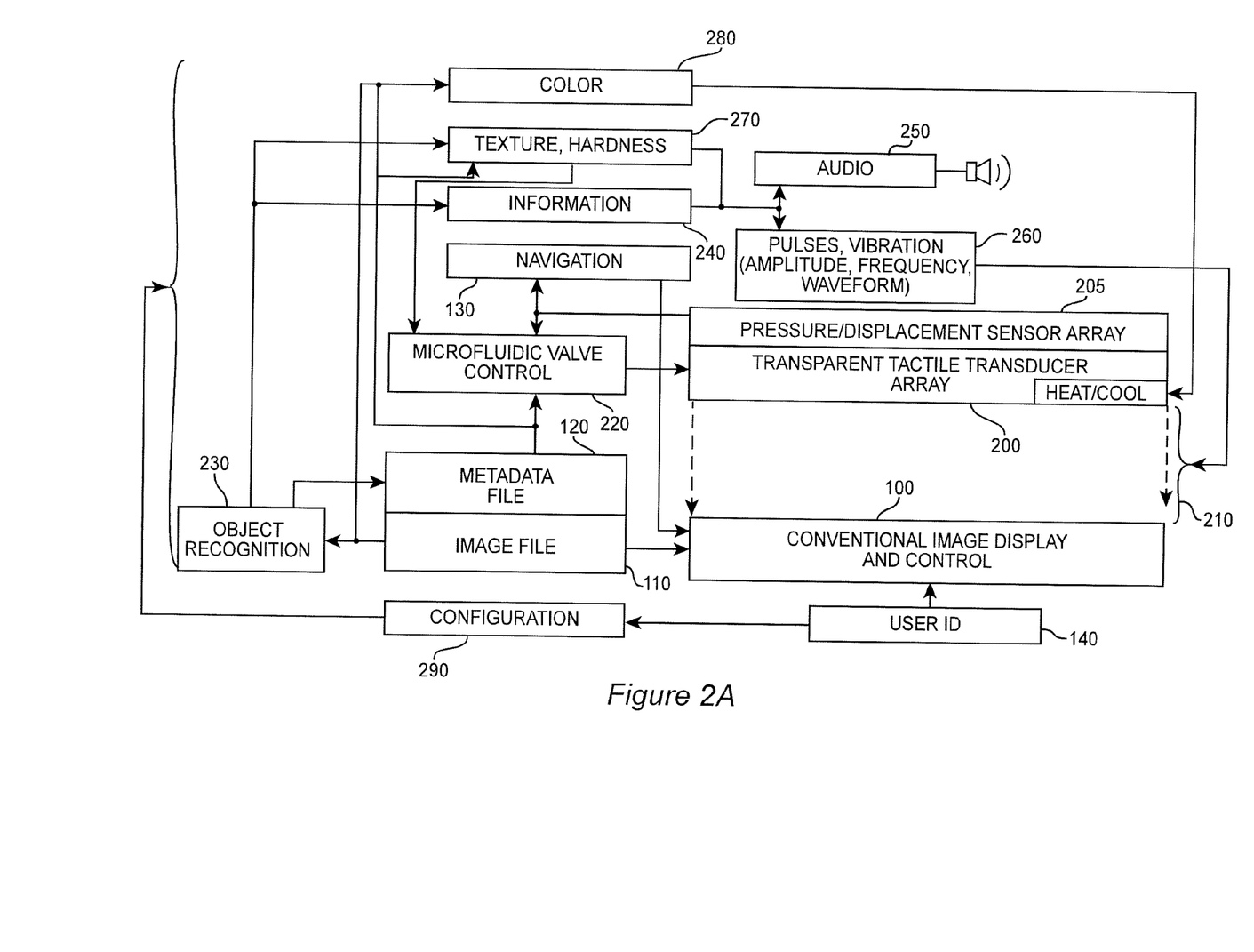
FIG. 2A is a high-level block diagram of the invention illustrating the overall organization of the invention.

Having described a preferred technique of developing basic distance metadata, reference is now made to FIG. 2A, illustrating a high level block diagram of the invention that may be useful in conveying the relationship and cooperation of the basic tactile overlay transducer/display with a conventional image display and the relationship and cooperation of various optional but preferred perfecting features of the invention with the basic invention and, in turn, the conventional image display. Further, FIG. 2A provides a context for the numerous novel and distinctive features of the invention which will be described in detail below.

As shown in FIG. 2A, a conventional image display and control 100 is provided by, for example, a display panel of a computer, a tablet-type digital device, smart phone or the like which is capable of producing a visually perceptible image from data in an image file 110. (It should be understood that the term "conventional" is used herein in the sense that the invention may be retrofit to existing display devices and that the details thereof are unimportant to the practice of the present invention. The term is not intended to exclude image display devices that are foreseeable or may be developed in the future; with which the invention can also be advantageously used.) At the present state of the art, a metadata file 120 corresponding to the image file and containing information about the content of the image file 110 will usually also exist as a portion of the image file, if only to identify the image, or can be easily generated therefrom. The conventional image display and control may or may not include touch and/or gesture sensors which may be used to pan, scroll, rotate or zoom (e.g. magnify or reduce) the image; such functions being collectively referred to as navigation 130 with which the invention preferably interacts. Display 100 may or may not provide for tactile feedback, particularly if usable as an input device as alluded to above. If such tactile feedback is not a feature of display 100, it can easily be provided through various functions of the present invention. Similarly, if such sensors and navigation functionality are not included in the particular conventional image display structure 100, it is provided by the invention as will be described below. The device providing the conventional image display preferably also includes structure for identifying an authorized user such as password verification, biometrics (e.g. fingerprint sensor) or the like, collectively indicated at 140 and which controls operation of the display and/or grants access to image files.

As described above, distance data can be captured or developed through various forms of image analysis that are known or foreseeable and stored as metadata in the metadata file 120. When an image is selected and displayed, distance data is accessed and used to control a tactile display 200 which is preferably mounted over the image display in registration therewith as indicated by dashed arrows to allow a partially sighted person to also view the visual image to the extent possible. (Of course, the visual display need not be provided for persons who are totally blind.)

The tactile display 200 preferably employs microfluidics technology as will be described below although the invention can be embodied using other tactile media. However, microfluidics technology is greatly preferred because of the possibility of developing an analog response (e.g. control over a continuum of positions or plurality of positions over a range in a step-wise manner with small step size) in the embodiment which will be described in detail below and capable of a resolution in area appropriate to a tactile display (e.g. about one-third of the width of a fingertip in each of two orthogonal directions such that a single finger touch at a location can detect both a relative height and a direction of a gradient in height) as well as being robust and resistant to damage while having other types of devices integrated therewith without interference. Other information about the image such as hardness/softness and/or texture 270, identity and/or other information (e.g. object or person identity, geographic location, context or the like, collectively referred to as context aware information) 240 and predominant color 280 of respective areas can be either captured or derived through image analysis (e.g. object/facial or other attribute recognition 230) and also stored as metadata to be used to provide other tactile stimuli to enhance interaction with and navigation of an image by blind or partially sighted users as will be discussed below as respective perfecting features of the invention; all of which are preferably configured (e.g. enabled, disabled or controlled in function) in accordance with a user identity as depicted at 290 of FIG. 2A.

Figure 2B:
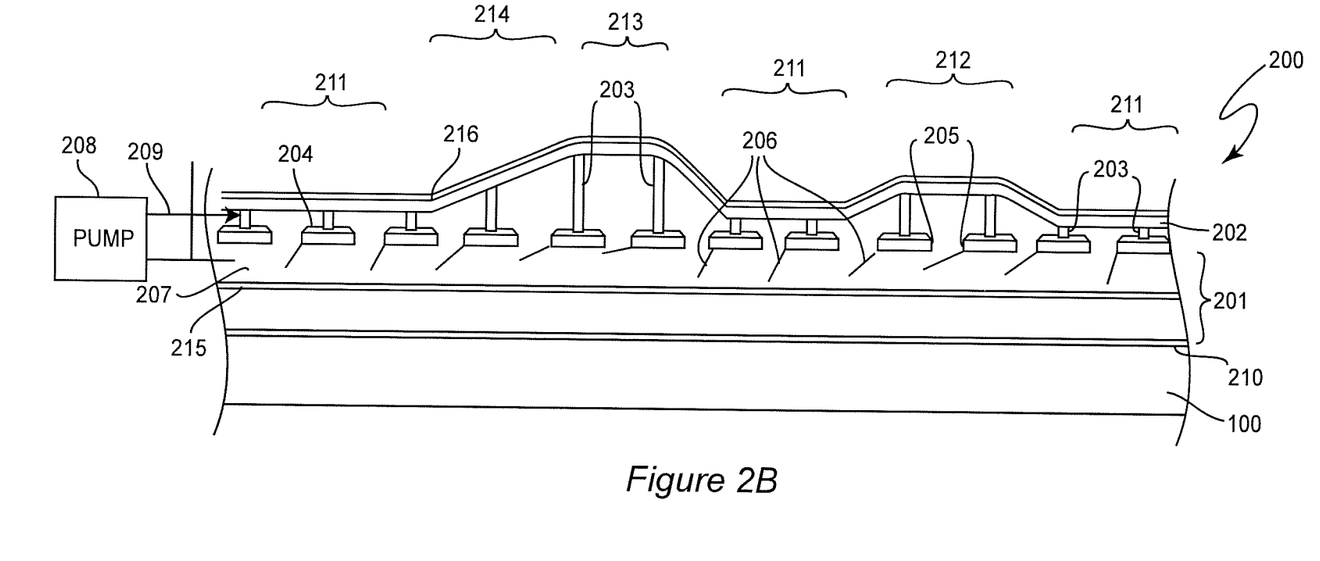
FIG. 2B is a cross-sectional view of a section of a portion of an exemplary microfluidics panel structure preferred for implementing the invention.

Referring now to FIG. 2B, a portion of a preferred form of microfluidics transducer/display 200 mounted over image display 100 (using intervening layer 210 which is preferably capable of functioning as a transducer to deliver pressure pulses or vibrations as tactile feedback of detection of a touch in a selected area, if not otherwise included in display panel 100, is shown in partially cut-away form. It should be understood that the structure illustrated is only one of many arrangements of the basic elements suitable for an embodiment of the invention and supporting all of the functions that will be described below for conveying increased amounts of image information and allowing navigation and manipulation of an image, particularly by persons having visual impairments. The body of tactile display 200 is a preferably rigid transparent substrate 201 which is overlaid with a flexible and elastic transparent membrane 202, preferably comprising polydimethylsiloxane (PDMS) and a cross-linking agent, commonly used in known microfluidic displays, that is separated from substrate 201 by a small distance defined by elastic surface formations 203, the shape of which is unimportant to the practice of the invention. However, the elasticity of the surface formations and the stiffness of membrane 202 should be such that the surface formations 203 are substantially undetectable by touch, even when the membrane exerts a tensile force on them, as illustrated, and provide a small spacing 204 through which a microfluidics fluid (preferably a liquid) may uniformly flow by capillary action at a low flow rate with a suitably limited restriction under a small pressure provided by the capillary action possibly supplemented by pumping in a manner which is also unimportant to the practice of the invention and can be performed in many known ways or which will be evident to those skilled in the art. A combination of the two mechanisms is generally preferred. Membrane 202 is thus held closely to but slightly separated from substrate 201 by attachment to the tops of the surface formations 203. However, electrostatic attraction, magnetic attraction or surface tension of the fluid or a combination thereof is also possible to maintain membrane 202 in place close to the substrate but allow the membrane to be raised by the fluid pressure in the microfluidic device. It should be appreciated that many configurations and operating mechanism of the microfluidic panel 200 are possible to cause relative displacement of selected regions of membrane 202 and a representative number of possible configurations and operating mechanisms are disclosed in U. S. Published Patent Application 2007/0160064. However, the embodiments disclosed therein are generally intended for emulating buttons or knobs where the areas that are raised by microfluidic pressure are of predetermined shapes and the displacement is of a fixed height. As will be discussed below, the invention is capable of displacing arbitrary and potentially continuous areas with relatively fine resolution (e.g. preferably 1-3 mm) to any of a continuum of heights over a range so that different heights and gradients of height can be discerned by touch.

To achieve such capabilities, substrate 201 includes a plurality of apertures 205, some or all of which are provided with valves 206, evenly distributed over the surface of the substrate and which allows the fluid to flow from between the substrate and flexible membrane in space 204 into channels 207 on the underside of the substrate 201 from which the fluid can be recirculated as schematically depicted by optional pump 208 and arrows 209. The nature of the valves is unimportant to the practice of the invention other than being capable of a continuous or step-wise variable degree of restriction of fluid flow therethrough. Thus, the otherwise uniform flow of fluid through the substrate apertures 205 can be made selectively non-uniform in selected areas by selective and controlled restriction of flow through the apertures 205 to cause localized fluid pressure increases. In general, the minimum spacing between the membrane 202 and substrate 201 and the viscosity of the fluid should be chosen such that fluid flow over the substrate surface and through the valves will be substantially uniform when the valves are uniformly un-energized and open as illustrated at areas 211, but the pressure across the valves will increase as the valves are energized to restrict flow and cause localized pressure changes and gradients across the substrate surface; causing displacement of the membrane away from the substrate surface and applying tension to the elastic surface formations 203. Note that the height of membrane 202 in region 212 where the valves are partially closed in lower than the height in region 213 where the valves are fully closed and that gradients of height and textures can be achieved as shown in region 214 by partial opening or modulation of the valves. Thus, the localized pressure increases cause increased separation of membrane 202 from substrate 201 with the separation distance or height closely corresponding to the amount of localized pressure increase.

The height of the separation can be sensed, preferably by local pressure, and regulated by a feedback arrangement. Local pressure sensing and control is preferred since it facilitates provision of other tactile effects that will be discussed below. Pressure sensors of sufficiently small size are known in the art and can be provided in an array forming a layer 215 of the tactile display. For example, a pressure sensor array is known having individual pressure sensors formed of zinc oxide nanowires of 1.5 µm diameter at a spacing of 8.0 µm and which provide an electroluminescent output, thus avoiding a need to provide individual electrical connections thereto. It is also preferred for implementation of a perfecting feature of the invention to include resistors for heating and/or Peltier junctions or the like for cooling in either the substrate 201 or membrane 202 as schematically depicted as layer 216 which can also serve as capacitive touch or proximity sensors as will be described in greater detail below.

It should be appreciated that some microfluidic transducers that have been proposed for use as virtual buttons or knobs were controlled in a matrix selection fashion in which a matrix grid of connections are made or pressure applied to orthogonally extending conduits. While such a selection and actuation technique provides some significant simplification of control and manufacturing methods, it also presents the problem of half-selection which reduces the fidelity of the intended function and can be very confusing to blind or partially sighted users. That is, matrix selection is necessarily carried out by selection/actuation of selected intersecting rows and columns covering an area and full actuation is intended only at the intersection of the selected rows and columns. However, in matrix selection using pressure, a partial response will be observed over the entire length of the selected columns and rows and is not only easily detected by touch, it is often not readily distinguishable from the full intended response. Therefore, it is preferred for implementation of the invention to reduce the resolution of the tactile display 200 well below (e.g. to 1-2 mm in each coordinate direction) the resolution of the visual image display 100 and to control the valves of the respective (reduced resolution/enlarged) areas independently either through separate driving connections or the provision of scanning with local (e.g. capacitive) storage of the control signals which can be readily included between pressure sensors in layer 215 of FIG. 2B.

As alluded to above, the development (or manual entry) of distance metadata also serves the function of determining at least the major discrete objects in a given image. It should also be appreciated that the technology of object identification to determine particular types of articles has become very sophisticated, particularly in recent years and has been applied to assist in many different endeavors. For example, in automatic inspection systems such as may be employed in semiconductor manufacture, object identification systems have existed for many years that locate variations of surfaces and structures from their intended shapes and to sort the respective variant shapes (as well as the expected shapes) in accordance with the type of object or variation the shape represents. The inventors have discovered that such object identification and recognition technology can greatly enhance the availability of information in an image to a user, particularly a user that is visually impaired. Further, such technology is effective for this purpose even if implemented at only a relatively rudimentary level. That is, to greatly enhance the ability of a visually impaired person to identify an object, it is only necessary to be able to sort objects and respective portions of objects into broad categories or types and generate metadata appropriate to those broad categories or types of objects or object portions to greatly enhance the recognition of such objects or object portions by a visually impaired user or allow tactile attributes of an object to be at least approximately experienced, regardless of visual impairment.

Examples of broad categories or identities of types of objects may include (without limitation) background, trees and plants and principal parts thereof, animals, buildings and architectural structures, liquids (e.g. bodies of water), vehicles of various types (e.g. airplanes, boats, automobiles, trucks and motorcycles), fabrics, objects generally made of particular materials, and even persons and the like, all of which can be readily distinguished by their overall shapes or combinations of features. Such metadata may also include explicit, specific identification such as the identity of a person or a distinctively shaped object such and the Eiffel Tower or a geographic location such as the Grand Canyon, caverns or natural bridges or other natural stone formations.

Each of the broad categories of object identities will also have some properties that can be conveyed by the tactile display in accordance with the invention. For example, hardness or softness and textures will correspond to the different types or categories of objects and can be stored as metadata and retrieved for control of the tactile display in a manner similar to that used for distance data as described above. However, in the case softness/hardness of an object or portion thereof, such qualities can be portrayed by the tactile display by sensing the pressure of a user's touch from the shape or pattern of pressure increase or by capacitive sensing of the area touched as the contact area will increase with increased pressure of a fingertip and determining the resulting depression of a raised area. (Any object in front of a background area will have a lesser value of distance metadata and will necessarily be raised to some degree.) The deflection in response to the pressure of touching the raised area can then be compared to metadata indicating the likely deflection of an object of the identified type or category and the pressure of the touched area raised to some degree indicative of the hardness/softness of the object by altering the compliance of membrane 202 while still maintaining the same approximate height of membranes 202. (The metadata is essentially a value indicating an approximation of an average Young's modulus of a surface of an object of the recognized type.) Depending on the result of the comparison, pressure in the raised area can be increased or decreased accordingly by control of valves 206 as discussed above as can be easily achieved by alteration of gain in the feedback path for controlling membrane height as alluded to above.

(In this regard, it should be noted that it is preferred to provide pressure sensors internally of the microfluidics transducer and to provide them at a density that approximates the pixel resolution of the visual image display. Thus, the increase of pressure when the microfluidics transducer is touched is indicative of the deflection of the raised area. Compensation for differences in pressure applied by the user can be achieved by normalizing in accordance with the area of the touch since an increased touch pressure will result in a greater touched area in view of the resiliency of the user's skin. Further, a given touch pressure will result in a reduced internal pressure excursion in the raised area of the microfluidics device at higher pressure/increased height and vice-versa. Therefore, a single array of internal pressure sensors is considered sufficient by the inventors to derive data for determination of both types of function although separate arrays of sensors which may be of different types (e.g. capacitive, fiber optic and the like) may be preferable for some embodiments.)

Thus, if a tree is depicted in the image being displayed, it is likely to have an area identified as a trunk and another area identified as foliage. The bark on the trunk may also be important information in the image. To portray these features of the tree, the tactile display would be controlled to increase pressure when touched in areas corresponding to the tree trunk and reduce pressure when touched in areas corresponding to foliage. Texture of tree bark can be represented by sensing navigation touch patterns or gestures to cause zooming of the image until the bark texture can be resolved by the tactile display. Textures such as the feel of fabrics are simulated/approximated with some combination of amplitude, frequency and waveform of a vibration produced by transducer 210. Various degrees of tactile compliance and vibrations can be provided and approximated for other types of objects or portions thereof. For example, a high degree of hardness would be applied as described above in the case of buildings and a degree of softness would be specified for fabrics or liquids while an intermediate compliance value would be provided to indicate animals or persons.

If an object is identified as a person, facial recognition which has been developed to a very sophisticated degree can preferably but optionally be applied as a further perfecting feature of the invention (e.g. providing additional or improved functionality to the basic invention but unnecessary to the practice of the invention in accordance with its basic principles). When an identification of a person is made, the name of the person (which could be derived by facial recognition or entered manually and included with the image file metadata) is read out and used to control the tactile display with a series of pulses applied to transducer layer 210 to convey that information to a visually impaired user. Alternatively, the identity information could be read out to a voice synthesizer using, for example, natural language processing or other audible annunciator arrangement 250 to provide audible information to a user. The same type of identification information can also be provided in accordance with recognized types of objects such as providing the name of a building or the name of a particular type of plant.

Color is a further attribute of objects and image areas that can be portrayed and communicated by the tactile display as yet another perfecting feature of the invention. Color information can be derived directly from objects in the image and either stored and retrieved as additional metadata as described above or derived directly from the image being currently displayed. However, it is preferred to detect the predominant color in a segment or sub-area of the image and storage of that information as metadata. This information is preferably portrayed as or represented by temperature of the surface of the tactile display which can be controlled using resistive heater elements or Peltier junctions or the like as alluded to above; colors generally regarded as being "cooler" such as blues and greens being preferably indicated by reduced temperatures and colors generally regarded as being "warmer" such as reds, oranges and browns being preferably indicated by increased temperatures. Generally, a temperature excursion of not greater than twenty degrees Fahrenheit is entirely sufficient to convey an approximation of color and which can be attained by resistive heaters and/or Peltier junctions in a short time with relatively low power consumption. Further, the ability of a visually impaired user to spatially resolve a heated or cooled area is generally less than the spatial resolution of raised areas discussed above, dividing the image area into a matrix of sub-areas (e.g. 3×3. 3×4, 5×6, etc.) and portraying only the predominant color in the sub-areas is entirely sufficient for most visually impaired users who appear to impute the predominant color of a sub-area as portrayed by temperature to the principal object/raised area in or proximate to the sub-area.

It should also be appreciated that, with the possible exception of heating or cooling to convey predominant color in an area of an image the response speed of a microfluidic transducer and ancillary tactile transducers described above is at least comparable to the acquisition of information therefrom by a user with significant visual impairment. Therefore, a degree of animation is possible and considered to be within the scope of the present invention. The representation of predominant color can also be represented in reduced time by rapidity of tactile pulses or frequency of tactile vibration or an audible tone in which cooler colors may be represented by higher frequencies or pulse repetition rates and warmer colors represented by lower frequencies or pulse repetition rates or vice-versa. Such tactile "indicia would be distinct from, for example, pulses, vibrations and/or audible tones or words used for identity of an object or person or textures.

The functional elements and data flows to support all of the above-described capabilities for conveying additional information about an image to a visually impaired user are evident from FIG. 2A. For example, image file information is subjected to object (and possibly facial) recognition which supplies texture and hardness information and identification information. The texture and hardness information is then supplied to the microfluidic valve control which also receives information as feedback from a pressure/displacement sensor array with high resolution. Texture information can also be utilized by an audio annunciator 250 or by transducer 210 to generate vibrations which approximate the feel of the object. Identification information is used to control the generation of coded tactile pulses or audio interpretation or both.

In summary, the principal components of the invention are a tactile display device, a user identification arrangement, image analysis processing, automated mapping of a processed 3D image representation of tactile attributes and a microfluidics display device; some of which may be optionally provided or omitted or selectively disabled during automatic configuration in accordance with a user identification in accordance with user preferences. For example, a visually impaired user that is capable of perceiving colors to some degree may wish to disable the portrayal of color by temperature to conserve power. other visual attributes such as blinking of a visual display may be emulated by interruptions of pulses vibrations or audible sounds and would thus also be distinct from other types of tactile communication.

The tactile display device includes a microfluidics panel to allow dynamic raising of selected portions of the touch panel by a selected distance based on distance information which can be captured or derived through image processing to create a three-dimensional image in membrane 202 that a user can touch and navigate and to whom substantial additional information about the image can be easily conveyed. Pressure sensors at a resolution similar to the pixel resolution of the image allow accurate control of the height to which areas of the touch panel are raised and can also be used to control hardness/softness or elasticity/compliance of objects portrayed in the image. A fingerprint reader or other biometrics transducer can be optionally included to identify the user and automate configuration of the microfluidics panel, particularly in regard to various perfecting feature of the invention discussed above such as indicating identification or objects or persons and the indication of color.

If provided, the component for identification of a user can optionally detect usage patterns such as the manner in which the user touches the touch panel to infer the level or degree of visual impair dent of the user to selectively enable features of the invention discussed above. Otherwise, selective enablement can be automatically performed based on user identification alluded to above or login credentials or performed manually.

The provision of image analysis processing provides object identification and classification into object types from which additional metadata can be derived that can convey identification information to the user in an efficient manner and allow the user to experience at least an approximation of the touching of an object included in a displayed image, such as the texture of a fabric or surface of an object. The image analysis processing also maps tactile attributes such as hardness onto the 3D image representation either at a resolution that can be sensed by touch or over respective sub-areas of the image. Alternatively, metadata derived through image analysis can be captured as the image is captured, derived directly from image data, derived from user manipulations of the image or image generation or simply specified in regard to a particular image.

Figure 3:
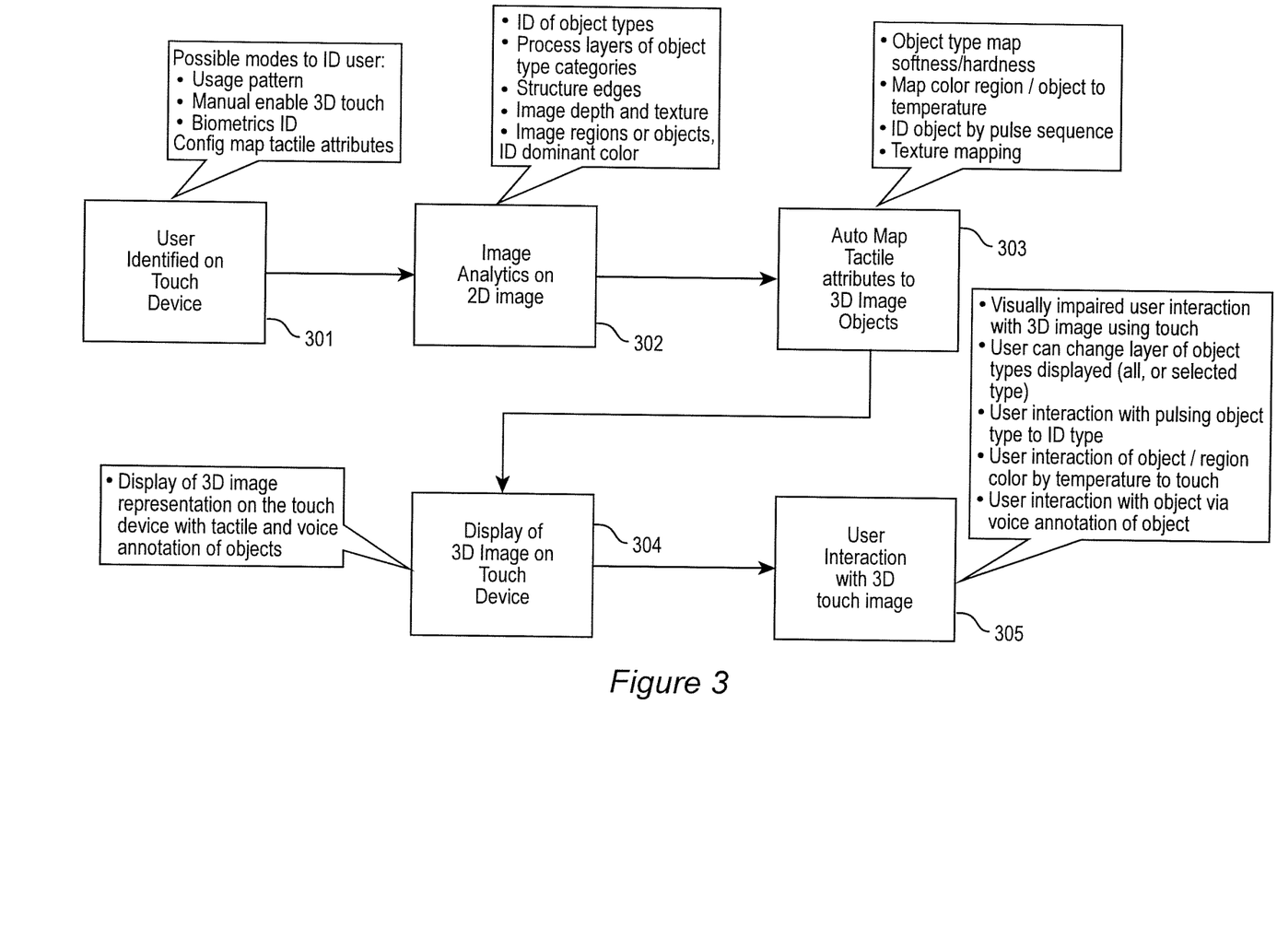
FIG. 3 is a block diagram indicating the preferred architecture of logical components and preferred functionality in accordance with the invention.

Referring now to FIG. 3, the logical cooperation and interaction of the basic components and functional elements of the invention will now be discussed. First, the user or the degree of visual impairment of the user is identified and the configuration of the microfluidics transducer panel is established. As alluded to above, this function can be achieved in several ways such as by biometrics sensing, or from the user login credentials such as password(s) or can be performed by manually enabling or disabling certain features or determined from usage/touch patterns. For example, a blind user will need to first locate the touch panel and display by touch and will thus initially touch the touch panel display and the area surrounding it somewhat randomly and then determine the boundaries of the touch panel display by a scanning contact across it. This touch pattern is unlikely for a partially sighted person who would initially touch the touch panel display near its center and scan outwardly to determine what tactile information, if any, is present. This difference in usage pattern is readily detectable and accurately infers the degree of visual impairment, if any, of the user. It should be appreciated that any of these techniques for identification of a user and/or determination of degree of visual impairment can be used singly or in any combination. That is, the mapping of tactile attributes (e.g. hardness/compliance and texture mapping based on recognized object types, color mapping to temperature, object identification by tactile pulses and/or audible signaling) can be configured in accordance with user preferences as well as based on known or detected degree of visual impairment.

Second, as depicted at 302, the touch panel can be used in a known manner to access review and select an image for display in a manner ubiquitous in the art and the selected 2D image displayed on visual display 100 (FIG. 2A) then, the user can initiate generation of a 3D image on the touch panel display. The generation of the 3D image begins with accessing distance metadata, if available (e.g. captured in connection with capturing an image as discussed above) and image analysis, both of which can proceed concurrently. The image analysis includes object identification including layers in accordance with distance and sorting by object type categories, determination of object edges and occultation, determination of image texture and hardness/compliance and determination of color or dominant color of an image region or sub-area. Next, as depicted at 303, these tactile attributes determined from metadata are mapped to 3D image objects which correspond to 2D objects in the visual image. The tactile attributes are then rendered on the tactile transducer to the extent they are enabled on the touch device, as depicted at 304, in accordance with the configuration established for and by a user.

At this point, the user will be fully enabled to interact with the 3D image using touch. Such interactions include (without limitation) change layers of object types, alter a layer in which an object is depicted, manipulations of objects in accordance with object type, and suppression of layers, user responses to pulses or audible annotation of indicating object type and/or identity, alteration of textures, alteration of the display (e.g. magnification) to observe texture and alteration of color of objects or regions of the image.

In view of the foregoing, it is seen that the invention provides for the portrayal of significant amounts of information beyond that which can be conveyed visually by a 2D image. Further, such additional information conveyed by a 3D image corresponding to the 2D image but containing tactile attributes principally sensed in a manner very similar to the way an actual object included in an image may be experienced can greatly enhance image comprehension by visually impaired or blind users as well as facilitating navigation and manipulation of the image in a natural and intuitive manner.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A touch screen comprising
   an image file containing metadata and data representing a visually perceptible image,
   an image analyzer for analyzing said data and metadata representing said visually perceptible image, said image analyzer including logic for recognizing and classifying objects represented and arranged in said image by identified type, mapping tactile attributes corresponding to each respective identified type and storing results of said recognizing and classifying of objects and said mapping of tactile attributes as metadata, and
   a microfluidic transducer for producing selectively raised areas of a surface to represent said tactile attributes of said recognized and classified objects and the arrangement of said objects in said image wherein height of said selectively raised areas represents distance from a viewing point in said image.

2. The touch screen as recited in claim 1, wherein said microfluidic transducer includes a pressure sensor and a feedback arrangement to control said height in accordance with said metadata.

3. The touch screen as recited in claim 1, wherein said microfluidic transducer includes a pressure sensor and a feedback arrangement to control said height in accordance with said metadata representing said arrangement of objects.

4. The touch screen as recited in claim 3, wherein said microfluidic transducer includes a touch sensor and a feedback arrangement to control compliance of a selectively raised area in accordance with said tactile attributes.

5. The touch screen as recited in claim 4, wherein said touch sensor is a pressure sensor.

6. The touch screen as recited in claim 4, wherein said touch sensor is a capacitive sensor.

7. The touch screen as recited in claim 1, wherein said microfluidic transducer includes a touch sensor and a feedback arrangement to control compliance of a selectively raised area in accordance with said tactile attributes.

8. The touch screen as recited in claim 7, wherein said touch sensor is a pressure sensor.

9. The touch screen as recited in claim 7, wherein said touch sensor is a capacitive sensor.

10. The touch screen as recited in claim 1 further including a touch sensor and logic for selection of an object in said image.

11. The touch screen as recited in claim 10, further including a tactile transducer for causing motion of said touch screen.

12. The touch screen as recited in claim 11, wherein said motion is vibratory.

13. The touch screen as recited in claim 11, wherein said motion represents an identity of an object.

14. The touch screen as recited in claim 10, further including an audible transducer for identifying a selected object in said image.

15. A method of conveying graphic information comprising steps of
   determining relative distance information for objects in an image, said distance information corresponding to respective distances of said objects from a viewing point of said objects in said image,
   storing said distance information as metadata corresponding to said image in an electronic file of said image,
   mapping said distance information to locations on a microfluidic transducer,
   controlling said microfluidic transducer to raise at least one respective area of a surface of said microfluidic transducer to a height in a range of heights corresponding to said distance information mapped to said corresponding respective area to form raised areas corresponding to said image.

16. The method as recited in claim 15, further including a steps of
   recognizing respective ones of said objects in said image to provide object identity information, and
   when an object is selected by a user, representing said object identity by motion or temperature of said microfluidic transducer or with and audible annunciator.

17. The method as recited in claim 15, including a further steps of
   sensing pressure at a respective area of said microfluidic transducer, and
   regulating height or compliance of a respective area of said microfluidic transducer.

18. The method as recited in claim 15, further including a step of
   manipulating said raised areas on said microfluidic transducer corresponding to said image.

19. The method as recited in claim 18 wherein said manipulating step comprises at least one of
   selecting a plane of said objects, reordering of planes of object,
selecting an object in a plane of said objects,
zooming said image,
scrolling said image,
panning said image,
rotating said image, and
altering a point of view of said image.

\* \* \* \* \*